United States Patent
Ito et al.

(10) Patent No.: US 8,165,134 B2
(45) Date of Patent: Apr. 24, 2012

(54) MONITORING CONTROL SYSTEM, MONITORING DEVICE, MONITORING CONTROL METHOD, AND MONITORING CONTROL PROGRAM

(75) Inventors: Jun Ito, Kawasaki (JP); Tatsuhiro Furuya, Kawasaki (JP); Takaaki Kidachi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 742 days.

(21) Appl. No.: 11/965,721

(22) Filed: Dec. 27, 2007

(65) Prior Publication Data

US 2008/0159167 A1 Jul. 3, 2008

(30) Foreign Application Priority Data

Dec. 28, 2006 (JP) ................. 2006-356486

(51) Int. Cl.
*H04L 12/28* (2006.01)
(52) U.S. Cl. .................................... 370/395.5
(58) Field of Classification Search .. 370/395.5–395.54, 370/400–401, 465–466
See application file for complete search history.

(56) References Cited

U.S. PATENT DOCUMENTS

| 7,002,959 B2 * | 2/2006 | Suzuki et al. ................. 370/393 |
| 7,110,397 B1 * | 9/2006 | Abe et al. ...................... 370/389 |
| 2004/0090963 A1 | 5/2004 | Okagawa et al. |

FOREIGN PATENT DOCUMENTS

| JP | 10-164101 | 6/1998 |
| JP | 2004-40538 A | 2/2004 |
| JP | 2004-159112 | 6/2004 |

* cited by examiner

*Primary Examiner* — Frank Duong
(74) *Attorney, Agent, or Firm* — Myers Wolin, LLC.

(57) ABSTRACT

A monitoring control system including a monitoring device to monitor communication data communicated between communication terminals via a communication infrastructure. The monitoring device includes an address conversion table for storing a transmission source address and a transfer destination address in a corresponding relationship; a transfer unit receiving the communication data, obtaining a transfer destination address corresponding to a transmission source address of the received communication data from the address conversion table, and transferring the received communication data based on the obtained transfer destination address; and monitoring unit monitoring the received communication data.

15 Claims, 8 Drawing Sheets

| | PC-A | MONITORING DEVICE | | PC-B |
|---|---|---|---|---|
| IP ADDRESS | 111.111.1.11 | 222.222.2.22 | | 333.333.3.33 |
| | | A-SIDE PORT NO. | B-SIDE PORT NO. | |
| PORT NO. | 10 | 11 | 33 | 20 |

MONITORING CONTROL SYSTEM, MONITORING DEVICE, MONITORING CONTROL METHOD, AND MONITORING CONTROL PROGRAM

BACKGROUND OF THE INVENTION

1. Field of the Invention

The present invention relates to a monitoring control system, a monitoring device, a monitoring control method, and a monitoring control program, which are adapted for monitoring communication data communicated between communication terminals via a communication infrastructure.

2. Description of the Related Art

Recently, communication infrastructures utilizing IP technology have become increasingly prevalent. A communication infrastructure is constituted by a plurality of routers such that data transfer (so-called HOP-BY-HOP) between communication terminals is performed through routing among the plurality of routers. Further, the communication infrastructure includes a technique for monitoring communication data (e.g., an IP packet) communicated between the communication terminals via the communication infrastructure.

However, because data flows within the communication infrastructure depending on the routing configuration among the routers, it is very difficult to set monitoring points in the communication infrastructure and to monitor the data.

In view of such a situation, the related art proposes that a monitoring device is installed per line and a plurality of data distributors for collecting and transferring communication data to the monitoring device are installed on the line. A document regarding the related art, for example, Japanese Unexamined Patent Application Publication No. 2004-40538, discloses a technique of installing a plurality of data distributors (agents), which collect and transfer communication data to a monitoring device, on a line interconnecting communication terminals, and transferring the collected communication data to the monitoring device by the agents.

The above-described related art has the problem that, because the monitoring device is installed per line, the necessity of installing and maintaining many monitoring devices is inevitable and the cost is increased.

SUMMARY

According to an aspect of an embodiment, a monitoring control system including a monitoring device to monitor communication data communicated between communication terminals via a communication infrastructure, the monitoring device comprises an address conversion table for storing a transmission source address and a transfer destination address in a corresponding relationship; a transfer unit receiving the communication data, obtaining a transfer destination address corresponding to a transmission source address of the received communication data from the address conversion table, and transferring the received communication data based on the obtained transfer destination address; and a monitoring device monitoring the received communication data.

DESCRIPTION OF THE PREFERRED EMBODIMENTS

Examples of a monitoring control system, a monitoring device, a monitoring control method, and a monitoring control program according to the present invention will be described in detail below with reference to the accompanying drawings. It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

In the following, the outline and the features of a monitoring control system and the configuration and the processing flows of a monitoring device according to the first embodiment will be described in sequence.

The outline and the features of the monitoring control system according to the first exemplary embodiment are described and illustrated with reference to FIG. 1.

A monitoring control system 1 according to the first embodiment basically operates to monitor communication data communicated between communication terminals via a communication infrastructure 50.

The monitoring control system 1 includes a monitoring device 10 for monitoring an IP packet, a session controller 20 for controlling a communication session performed between PCs 30 via the communication infrastructure 50, a PC-A 30a as a transmission source and a PC-B 30b as a transfer destination which are connected to each other via the communication infrastructure 50, and a plurality of routers 40a-40c installed within the communication infrastructure 50. The monitoring device 10 includes an address conversion table 14a for storing an IP address of the source PC-A 30a and an IP address of the destination PC-B 30b in a corresponding relationship, and a monitoring log storage unit 14b for storing the received IP packet.

Figure 1:
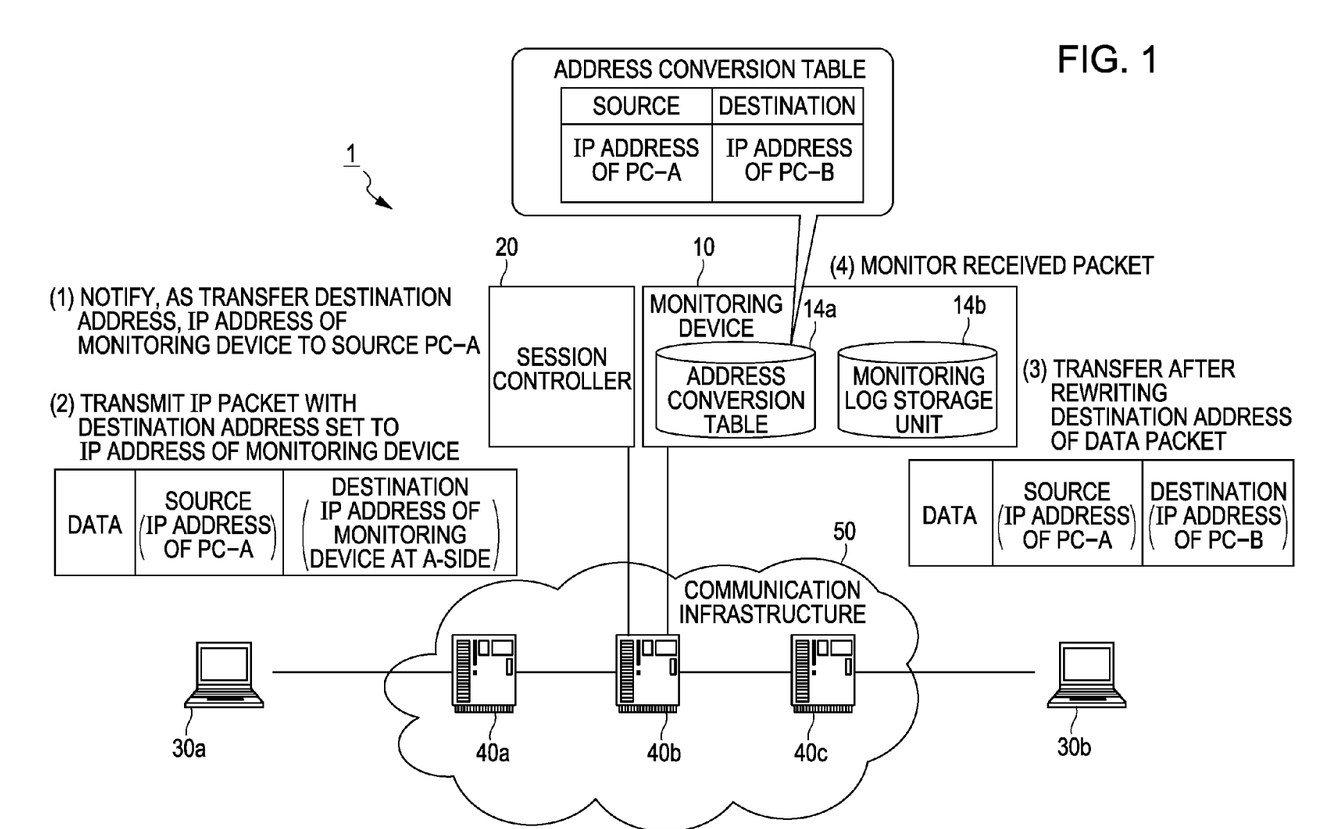
FIG. 1 is an illustration for explaining the outline and the features of a monitoring control system according to a first exemplary embodiment.

In the configuration described above, after the session controller 20 of the monitoring control system 1 notifies, as a transfer destination address, an IP address of the monitoring device 10 to the PC-A 30a during a control process for establishing a session (see (1) in FIG. 1), the PC-A 30a transmits an IP packet with a destination address set to the IP address of the monitoring device 10 (see (2) in FIG. 1).

Upon receiving the IP packet, the monitoring device 10 obtains a transfer destination address corresponding to the source address of the received IP packet from the address conversion table 14a, and transfers the IP packet to the obtained transfer destination address (see (3) in FIG. 1). More specifically, in the example shown in FIG. 1, the monitoring device 10 receives the IP packet and obtains the transfer destination address, i.e., "the IP address of PC-B", corresponding to the source address of the received IP packet, i.e., "the IP address of PC-A", from the address conversion table 14a. Then, the monitoring device 10 rewrites the destination address of the IP packet from "the IP address of the monitoring device 10" to "the IP address of PC-B" and transfers the IP packet to the PC-B 30b.

Further, the monitoring device 10 monitors the received IP packet (see (4) in FIG. 1). More specifically, the monitoring device 10 copies the received IP packet and stores it in the monitoring log storage unit 14b. In addition, the monitoring device 10 measures communication quality from data of the stored IP packet and monitors whether the communication quality is presented in accordance with the contract conditions.

Thus, the monitoring control system 1 can monitor the communication data relayed by the monitoring device 10 without installing a plurality of monitoring devices throughout the communication infrastructure.

Monitoring Device

Figure 2:
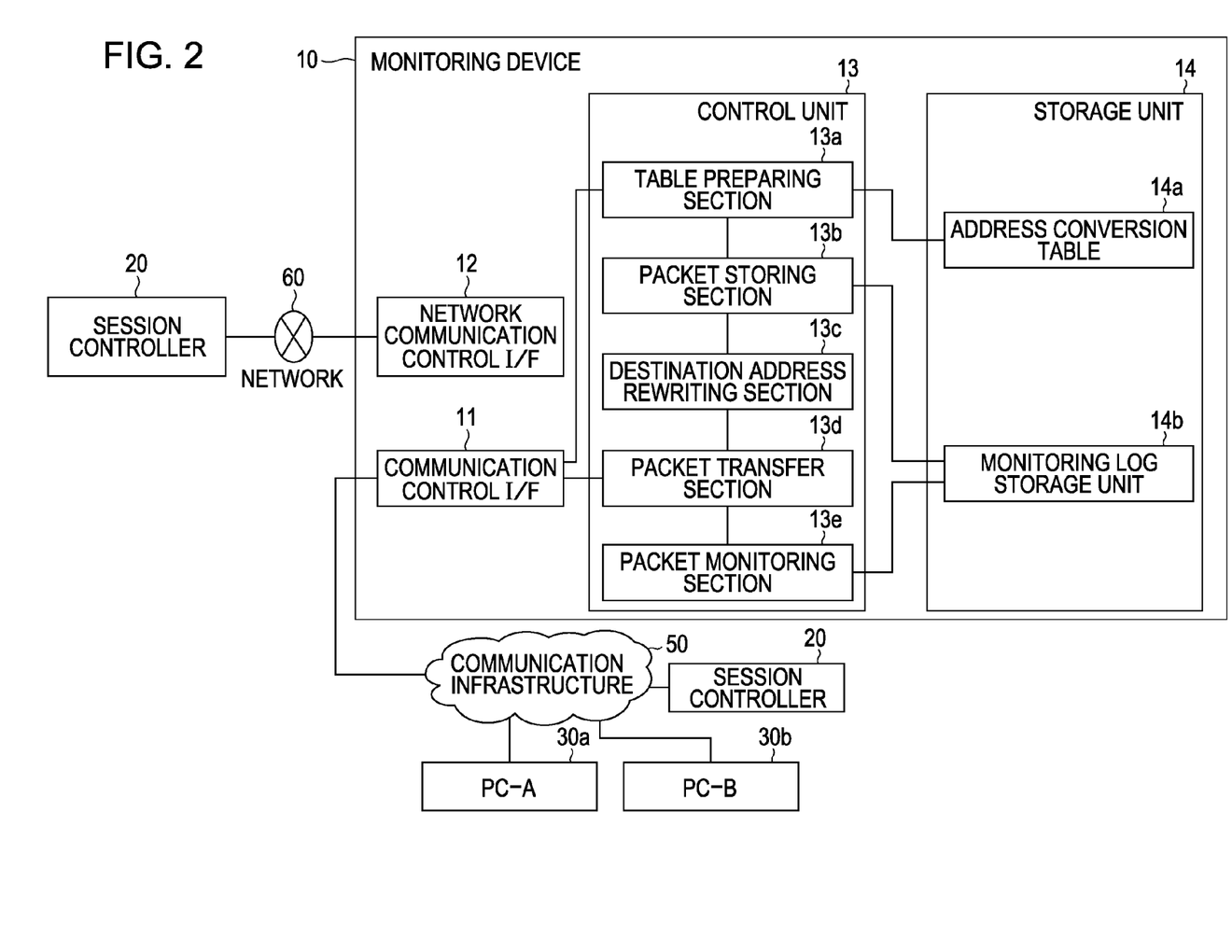
FIG. 2 is a block diagram of a monitoring device according to the first exemplary embodiment.
Figure 3:
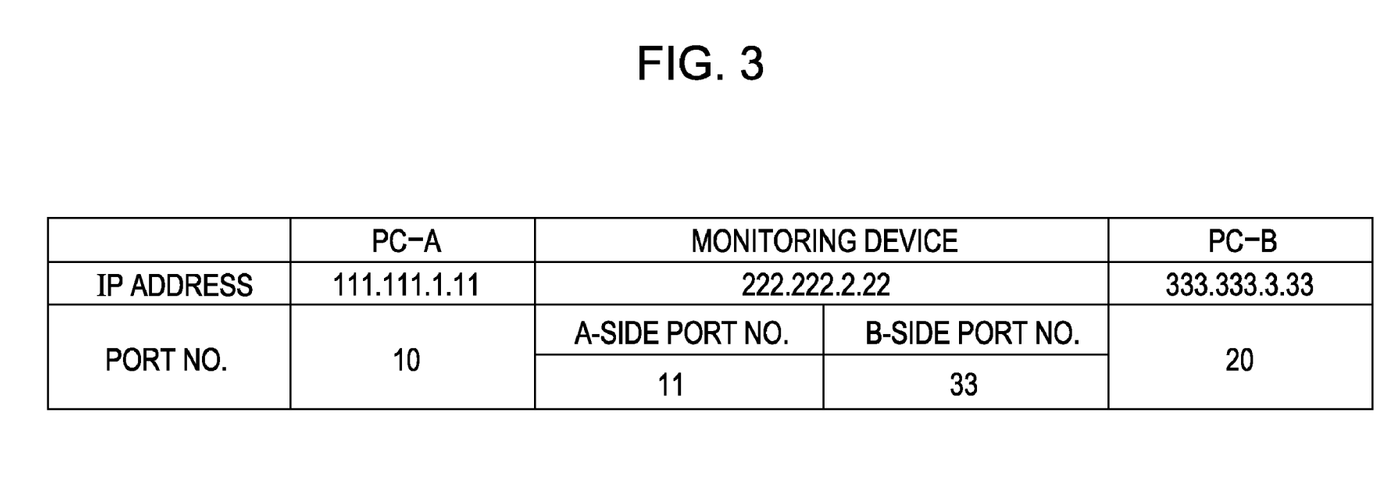
FIG. 3 is a table for explaining an address conversion table.

The construction of the monitoring device 10, shown in FIG. 1, will be described next with reference to FIGS. 2 and 3. FIG. 2 is a block diagram of the monitoring device 10 according to the first embodiment, and FIG. 3 is a table for explaining the address conversion table.

As shown in FIG. 2, the monitoring device 10 comprises a communication control I/F 11, a network communication control I/F 12, a control unit 13, and a storage unit 14. The monitoring device 10 is connected to the session controller 20 via a network 60 and is also connected to the PC-A 30a and the PC-B 30b via the communication infrastructure 50. The processing executed by those components will be described below.

The communication control I/F 11 controls communication for various kinds of information transferred to and from each of the PC-A 30a and the PC-B 30b which are connected to the monitoring device 10 via the communication infrastructure 50. By way of example, the communication control I/F 11 receives the IP packet transmitted from the PC-A 30a and transfers the received IP packet to the PC-B 30b.

The network communication control I/F 12 controls communication for various kinds of information transferred to and from the session controller 20 which is connected to the monitoring device 10 via the network 60. More specifically, the network communication control I/F 12 receives a monitoring instruction notice and a monitoring information update instruction from the session controller 20. Also, the network communication control I/F 12 transmits, to the session controller 20, a response to the monitoring instruction notice and a response to the monitoring information update instruction.

The storage unit 14 stores data and programs which are required for the control unit 13 to execute various kinds of processing. Particularly, in relation to the present invention, the storage unit 14 includes the address conversion table 14a and the monitoring log storage unit 14b.

The address conversion table 14a stores the IP address of the source PC-A 30a and the IP address of the destination PC-B 30b in a corresponding relationship. More specifically, as shown in FIG. 3, the address conversion table 14a stores the respective IP addresses and port numbers of the source PC-A 30a, the monitoring device 10, and the destination PC-B 30b in a corresponding relationship.

For the port number of the monitoring device 10, the address conversion table 14a stores the port number on the side connected to the PC-A 30a (i.e., A-side port No.) and the port number on the side connected to the PC-B 30b (i.e., B-side port No.). Herein, the port number on the side connected to the PC-A 30a and the port number on the side connected to the PC-B 30b are given by the least two digits of the IP addresses of the PC-A 30a and the PC-B 30b, respectively.

The monitoring log storage unit 14b stores the received IP packet. More specifically, the monitoring log storage unit 14b stores data of the IP packet received from the PC-A 30a and history information of the IP packet.

The control unit 13 has an internal memory for storing programs which specify various processing procedures, etc., and data necessary in association with the programs. Based on those programs and data, the control unit 13 executes various kinds of processing. Particularly, in relation to the present invention, the control unit 13 includes a table preparing section 13a, a packet storing section 13b, a destination address rewriting section 13c, a packet transfer section 13d, and a packet monitoring section 13e. Note that the destination address rewriting section 13c and the packet transfer section 13d correspond to a "transfer means", and the packet monitoring section 13e corresponds to a "monitoring means". The principles of the control unit 13 may be implemented as hardware or a combination of hardware and software and because some of the constituent system components and methods depicted in the accompanying drawings may be implemented in software, the actual connections between the system components or the process function blocks may differ depending upon the manner in which the present invention is programmed.

The table preparing section 13a prepares the address conversion table 14a based on information received from the session controller 20 at the time of establishing a session. More specifically, when the table preparing section 13a receives the monitoring instruction notice indicating the start of monitoring, it receives, from the session controller 20, the IP address of the source terminal, the port number of the source terminal, and the IP address of the transfer destination terminal, which are notified by the monitoring instruction notice.

Further, the table preparing section 13a allocates respective port numbers of the monitoring device 10 corresponding to the IP address of the source terminal, the port number of the source terminal, and the IP address of the transfer destination terminal, thus preparing the address conversion table 14a. The table preparing section 13a then transmits, to the session controller 20, a response indicating that the table preparing section 13a has received the monitoring instruction notice.

Thereafter, the table preparing section 13a receives, from the session controller 20, the monitoring information update instruction that notifies the port number of the PC-B 30b, thus completing the address conversion table 14a. The table preparing section 13a then transmits, to the session controller 20, a response indicating that the table preparing section 13a has received the monitoring information update instruction.

The packet storing section 13b stores the received IP packet in the monitoring log storage unit 14b. More specifically, upon receiving the IP packet from the PC-A 30a after establishment of the session, the packet storing section 13b copies the received IP packet and stores it in the monitoring log storage unit 14b.

The destination address rewriting section 13c rewrites the destination address of the received IP packet. More specifically, the destination address rewriting section 13c rewrites the destination address of the IP packet from "the IP address of the monitoring device" to "the IP address of PC-B" which is the transfer destination. The destination address rewriting section 13c then notifies the packet transfer section 13d of the rewritten IP packet.

The packet transfer section 13d transfers the IP packet to the transfer destination address. More specifically, the packet transfer section 13d transmits the IP packet, which has been notified from the destination address rewriting section 13c, to the IP address of the PC-B 30b.

The packet monitoring section 13e monitors the received IP packet. More specifically, the packet monitoring section 13e measures communication quality from data of the IP packet which has been copied and stored in the monitoring log storage unit 14b. Further, the packet monitoring section 13e monitors whether the communication quality is presented in accordance with the contract conditions, and outputs the monitoring result to an output unit (not shown).

Session Establishing Process by Monitoring Control System

Figure 4:
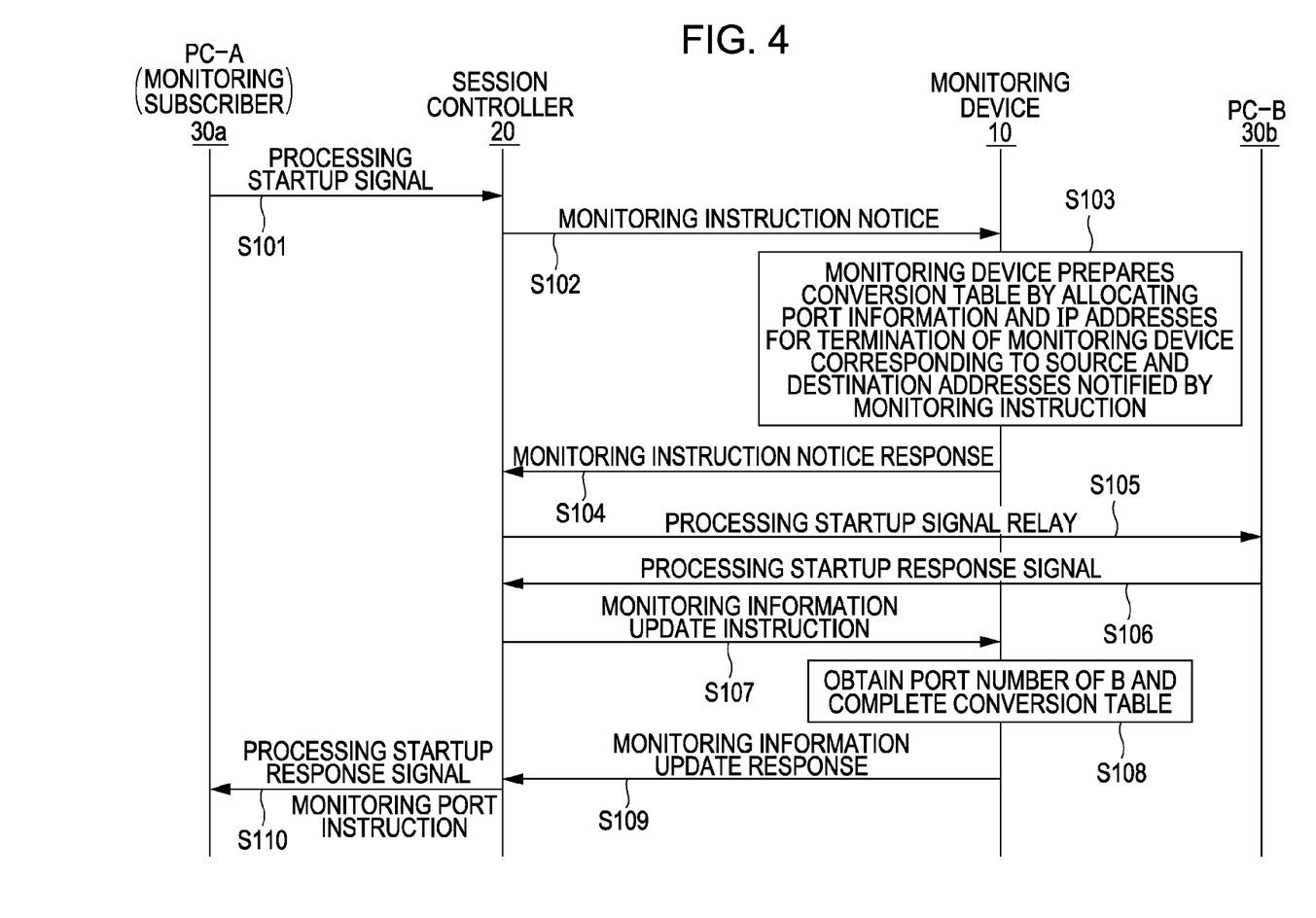
FIG. 4 is a sequence chart showing the processing operation of the monitoring control system according to the first exemplary embodiment.

The processing executed by the monitoring control system 1 according to the first embodiment will be described next with reference to FIG. 4. FIG. 4 is a sequence chart showing the processing operation of the monitoring control system 1.

As shown in FIG. 4, the PC-A 30a in the monitoring control system 1 transmits, to the session controller 20, a processing startup signal indicating that the PC-A 30a is now going to establish a session and to start communication with the PC-B 30b (step S101). When the PC-A 30a having transmitted the processing startup signal is a monitored subscriber, the session controller 20 transmits the monitoring instruction notice to the monitoring device 10 (step S102).

Upon receiving the monitoring instruction notice that indicates the start of monitoring, the monitoring device 10 receives, from the session controller 20, the IP address of the source terminal, the port number of the source terminal, and the IP address of the transfer destination terminal, which are notified by the monitoring instruction notice. Then, the table preparing section 13a allocates respective port numbers of the monitoring device 10 corresponding to the IP address of the source terminal, the port number of the source terminal, and the IP address of the transfer destination terminal, thus preparing the address conversion table 14a (step S103). Thereafter, the monitoring device 10 transmits, to the session controller 20, a response to the monitoring instruction notice to indicate that the monitoring device 10 has received the monitoring instruction notice (step S104).

Upon receiving the response to the monitoring instruction notice, the session controller 20 transmits (relays) the processing startup signal to the PC-B 30b (step S105). When the PC-B 30b receives the processing startup signal, the PC-B 30b transmits, to the session controller 20, a processing startup response signal indicating that it has received the processing startup signal (step S106). Upon receiving the processing startup response signal, the session controller 20 transmits a monitoring information update instruction to the monitoring device 10 (step S107).

Then, the monitoring device 10 receives, from the session controller 20, the monitoring information update instruction that notifies the port number of the PC-B 30b, thus completing the address conversion table 14a (step S108). Further, the monitoring device 10 transmits, to the session controller 20, a response indicating that the monitoring device 10 has received the monitoring information update instruction (step S109). Upon receiving the response to the monitoring information update instruction, the session controller 20 transmits a processing startup response signal and notifies the IP address and the port number of the monitoring device 10 to the PC-A 30a (step S110).

Monitoring Control Process by a Monitoring Device

Figure 5:
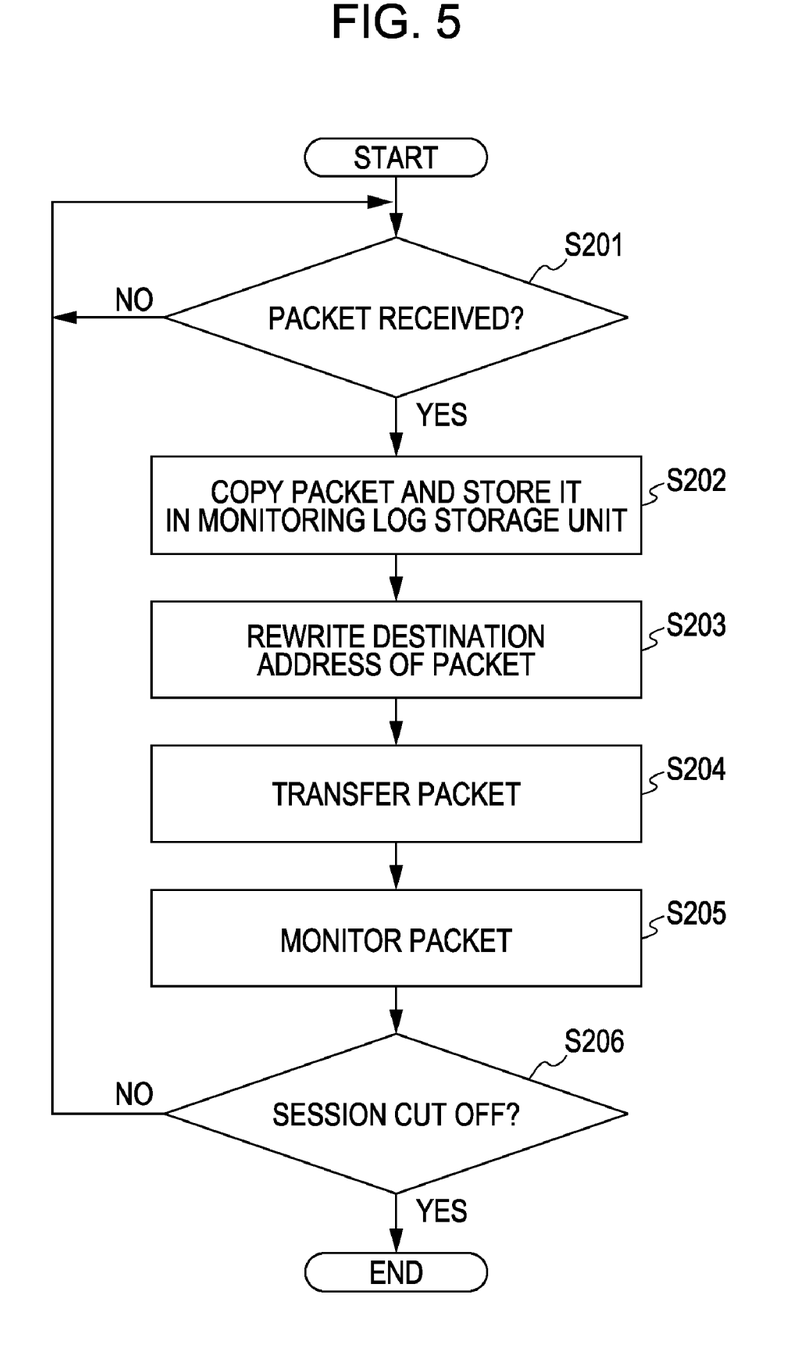
FIG. 5 is a flowchart showing the monitoring processing operation of the monitoring device according to the first exemplary embodiment.

The monitoring control process executed by the monitoring device 10 according to the first embodiment will be described below with reference to FIG. 5. FIG. 5 is a flowchart showing the monitoring processing operation of the monitoring device 10.

As shown in FIG. 5, upon receiving the IP packet from the PC-A 30a after establishment of the session (Yes in step S201), the monitoring device 10 copies the received IP packet and stores it in the monitoring log storage unit 14b (step S202). The destination address rewriting section 13c rewrites the destination address of the IP packet from "the IP address of the monitoring device" to "the IP packet address of PC-B" which is the transfer destination (step S203), and then notifies the packet transfer section 13d of the rewritten IP packet.

Subsequently, the packet transfer section 13d transmits the IP packet, which has been notified from the destination address rewriting section 13c, to the IP address of the PC-B 30b (step S204). The packet monitoring section 13e measures communication quality from data of the IP packet which has been stored in the monitoring log storage unit 14b, and monitors whether the communication quality is presented in accordance with the contract conditions (step S205). Then, the packet monitoring section 13e determines whether the session is cut off (step S206). If the session is not cut off (No in step S206), the processing of S201-S206 is repeated. On the other hand, if the session is cut off (Yes in step S206), the monitoring control process is brought to an end.

As described above, the monitoring device operates through the steps of storing the transmission source address and the transfer destination address in the address conversion table 14a in a corresponding relationship, receiving the IP packet, obtaining the transfer destination address corresponding to the transmission source address of the IP packet, transferring the IP packet based on the obtained transfer destination address, and monitoring the received communication data. Therefore, the data of the IP packet relayed by the monitoring device 10 can be monitored without installing a plurality of monitoring devices.

Second Embodiment

While the first embodiment has been described above in connection with the case where the IP packet received by the monitoring device from the communication terminal within the same session has one type of content, the present invention is not limited to that case and the IP packet received by the monitoring device from the communication terminal within the same session may have plural types of contents. For example, when voices and texts alternately pass through the network within the same session, the monitoring device can monitor both the voices and the texts.

Figure 6:
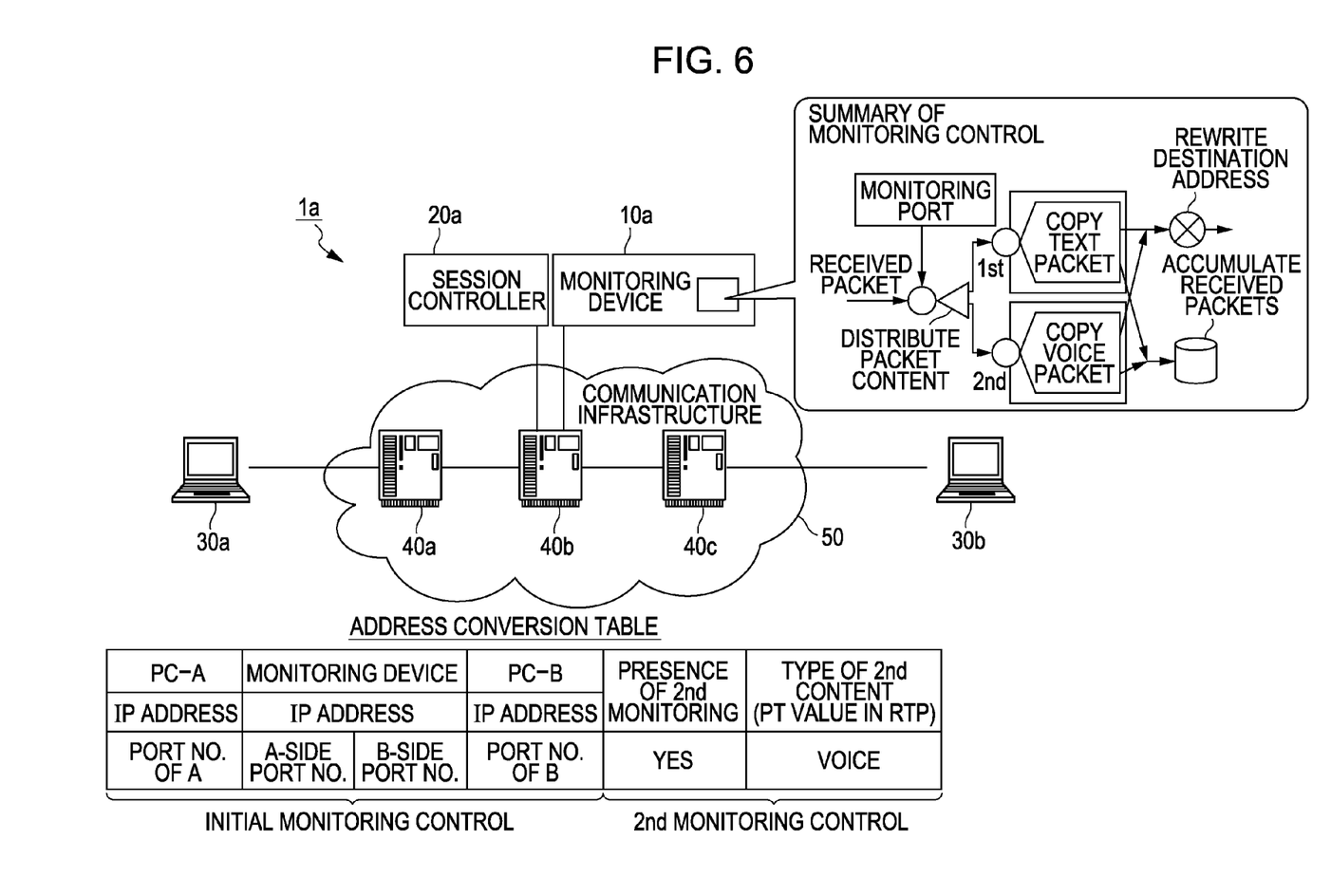
FIG. 6 is an illustration for explaining the outline and the features of a monitoring control system according to a second exemplary embodiment.

A second embodiment is adapted for the case where a monitoring device 10a monitors an IP packet having plural types of contents within the same session. The outline and the features of a monitoring control system 1a according to the second embodiment will be described below with reference to FIG. 6. FIG. 6 is an illustration for explaining the outline and the features of the monitoring control system 1a and the monitoring device 10a.

In addition to storing the IP address of the PC-A 30a which is the transmission source and the IP address of the PC-B 30b which is the transfer destination in a corresponding relationship, an address conversion table prepared in the monitoring device 10a according to the second embodiment further stores the "presence of 2nd monitoring" indicating whether a data packet includes plural types of contents, and the "type of 2nd content" indicating the substance of the content type. In the illustrated example of FIG. 6, the monitoring device 10a monitors texts as the 1st content and voices as the 2nd content.

The outline and the features of the monitoring control system 1a according to the second embodiment will now be described. As in the first embodiment, during a control process in which a session controller 20a of the monitoring control system 1a establishes a session, the monitoring device 10a notifies, as a transfer destination address, the IP address of the monitoring device 10a to the PC-A 30a, as shown in FIG. 6.

Also, during the control process of establishing the session, the session controller 20a according to the second embodiment refers to a profile of each monitoring subscriber. If it is determined in advance that the IP packet includes plural content types, the session controller 20a transmits an instruction to the monitoring device 10a so as to previously allocate a plurality of monitoring ports. After the establishment of the session, the PC-A 30a transmits an IP packet with a destination address set to the IP address of the monitoring device 10a.

Unlike the first embodiment, when the monitoring device 10a according to the second embodiment receives the IP packet, it analyzes the content type in the IP packet and monitors the IP packet depending on the analyzed content type of the IP packet. More specifically, the monitoring device 10a analyzes the content type in the IP packet and sorts the IP packet depending on the analyzed result. In the illustrated example of FIG. 6, when the analysis of the content type in the received IP packet indicates that the content type is "text", the monitoring device 10a transmits a text packet to a port for the 1st content. Also, when the analysis of the content type in the received IP packet indicates that the content type is "voice", the monitoring device 10a transmits a voice packet to a port for the 2nd content.

Further, the monitoring device 10a copies the text packet and the voice packet which are transmitted to the port for the 1st content and the port for the 2nd content, respectively, and stores those packets in the monitoring log storage unit 14b. Then, the monitoring device 10a monitors data of the stored IP packet. In addition, as in the first embodiment, the monitoring device 10a rewrites the destination address based on the address conversion table 14a and transfers the received IP packet.

Thus, in the second embodiment, the content type of the communication data is analyzed and the communication data is monitored depending on the analyzed content type of the communication data. Accordingly, even in a communication situation that plural types of contents are within the same session, for example voice and text are both transmitted in the same session, there is no necessity of installing any new additional device to perform the monitoring.

Third Embodiment

While the second embodiment has been described in connection with the case where the monitoring device transfers data of the received IP packet as it is, the present invention is not limited to that case. The data of the received IP packet may be transferred after media conversion. For example, the monitoring device can convert voice data to text data during transmission.

Figure 7:
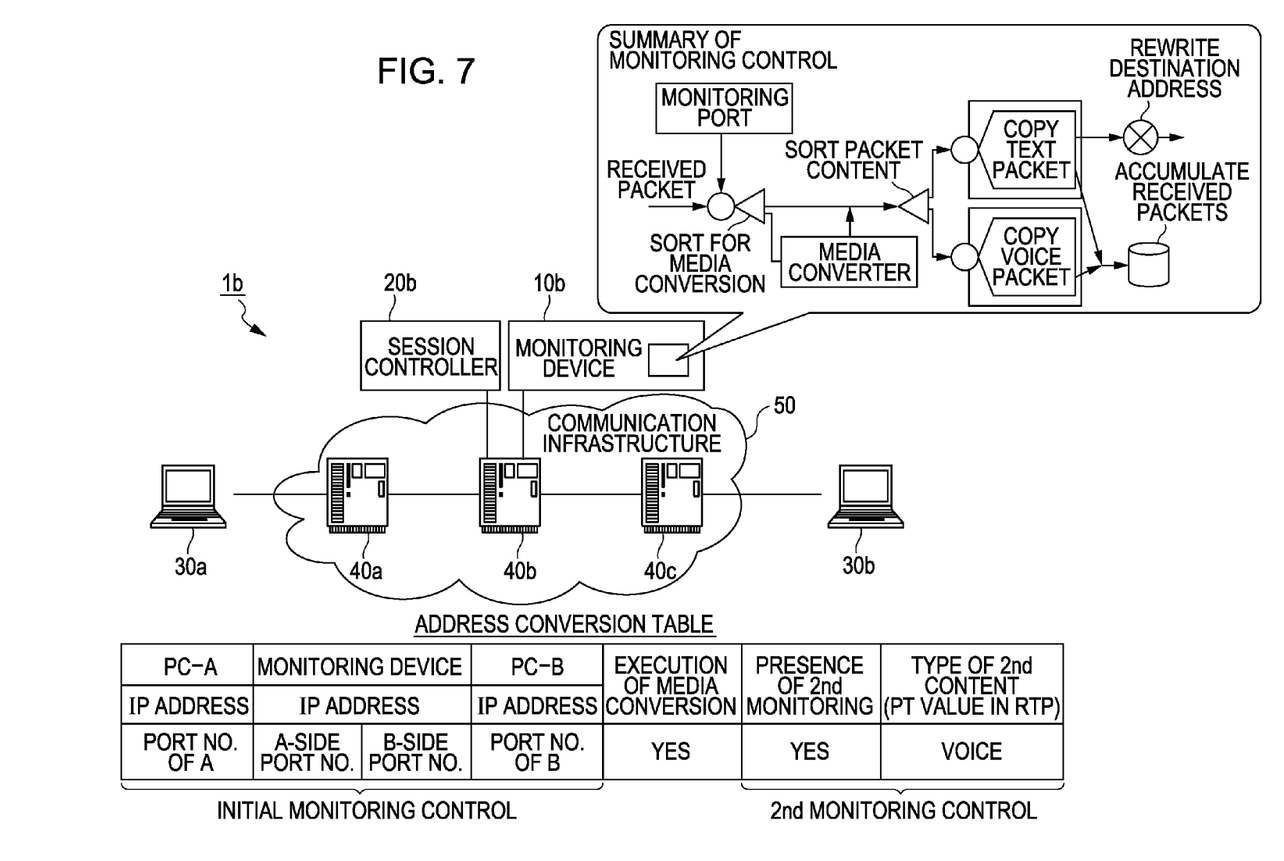
FIG. 7 is an illustration for explaining the outline and the features of a monitoring control system according to a third exemplary embodiment.

In a third embodiment, a monitoring device 10b transfers the data of the received IP packet after media conversion. The outline and the features of a monitoring control system 1b according to the third embodiment will be described with reference to FIG. 7. FIG. 7 is an illustration for explaining the outline and the features of the monitoring control system 1b and the monitoring device 10b.

In addition to storing the IP address of the PC-A 30a which is the transmission source and the IP address of the PC-B 30b which is the transfer destination in a corresponding relationship, an address conversion table prepared in the monitoring device 10b according to the third embodiment further stores the "presence of 2nd monitoring", the "type of 2nd content", and the "execution of media conversion" indicating whether media conversion is executed.

The outline and the features of the monitoring control system 1b according to the third embodiment will now be described. As in the second embodiment, during a control process in which a session controller 20b of the monitoring control system 1b establishes a session, the monitoring device 10b notifies, as a transfer destination address, the IP address of the monitoring device 10b to the PC-A 30a, as shown in FIG. 7.

Also, during the control process of establishing the session, the session controller 20b according to the third embodiment refers to a profile of each monitoring subscriber. If it is determined in advance that the media conversion is to be executed, the session controller 20b transmits an instruction to the monitoring device 10b so as to previously register the execution of the media conversion in a monitoring port. After the establishment of the session, the PC-A 30a transmits an IP packet with a destination address set to the IP address of the monitoring device 10b.

Unlike the second embodiment, when the monitoring device 10b according to the third embodiment receives the IP packet, it analyzes the content type in the IP packet and transmits data of the IP packet to a media converter depending on the analyzed content type of the IP packet, thereby performing the media conversion of the IP packet. For example, the media converter in the monitoring device 10b converts voice data to text data.

Thereafter, as in the second embodiment, the monitoring device 10b copies and stores the IC packet depending on the content type. In addition, the monitoring device 10b rewrites the destination address of the received IC packet based on the address conversion table 14a and transfers the IP packet.

Thus, in the third embodiment, when the instruction of executing the media conversion of the IP packet is received from the session controller for controlling sessions, the IP packet is subjected to the media conversion and the converted IP packet is transferred to the transfer destination address. Accordingly, even in a communication situation that voice data is converted to text data during transmission, there is no necessity of installing any new additional device to perform the monitoring.

Fourth Embodiment

While several embodiments of the present invention have been described above, the present invention is not limited to the foregoing embodiments and can also be implemented in other various different forms. For example, a fourth embodiment of the present invention, including those other various different forms, will be described below.

(1) Monitoring Request

While the first embodiment has been described above in connection with the case of always monitoring communication of the monitored subscriber, the present invention is not limited to that case. The monitoring may be started when a monitoring request from the monitored subscriber is received. For example, the session controller 20 can detect a malicious call and notify the detection of the malicious call to the communication terminal of the monitored subscriber. Then, monitoring control can be started when a monitoring request from the monitored subscriber is transmitted to the monitoring device 10.

Stated another way, in such a modification, since the IP packet is monitored when the request for starting the monitoring is received from the communication terminal, the monitoring can be performed, as required, instead of always performing the monitoring.

(2) Voiceprint Analysis

The present invention can also be applied to the case of performing a voiceprint analysis and determining whether service is to be provided. In a practical example, the monitoring device 10 previously registers the voiceprint of a user at a communication terminal which is other than a service target. At the time of monitoring a voice packet, the monitoring device 10 performs the voiceprint analysis of a received voice packet. If the analyzed voiceprint is the previously registered voiceprint, the monitoring device 10 notifies the session controller 20 of the analysis result, thereby cutting off the service.

In other words, the determination as to whether or not to provide the service can be assisted with the voiceprint analysis through the steps of storing the voiceprint of the user at the communication terminal which is other than the service target, analyzing the voiceprint of the received voice packet, and cutting off transfer of the voice packet if the analyzed voiceprint is the same as the stored voiceprint.

(3) Delivery of Monitored Information

Further, the present invention can be applied to the case of delivering the monitored information that is stored in the monitoring log storage unit 14*b*. For example, at the end of the session control, the monitoring device 10 converts the monitored information, which is stored in the monitoring log storage unit 14*b*, in accordance with (e.g., setting of notifying a record of telephone calls via a voice mail or a text mail) a data format, and delivers the monitored information to the relevant user. The data format may be a predetermined format or based upon a request. The relevant user is not limited to the monitored subscriber, and the monitored information can also be delivered to a third party other than the previously registered user.

Thus, since the monitoring device 10 stores communication data, converts the stored communication data to the data format, and delivers the converted communication data to the communication terminal, users can recognize their own communication data.

Also, since the communication data can be delivered to the communication terminal of a third party, the third party can recognize the communication data.

(4) Text Information

In addition, the present invention can be applied to the case of converting voice data to text data and delivering the text data together with the voice data. In a practical example, the monitoring device 10 converts the contents of speech to text data and transfers the text data to a region where users participating in the service can refer to the text data during the service in a shared manner.

Thus, the users participating in the service can refer to text information during the service.

(5) System Configuration and Others

The illustrated components of each device (including a unit or a section) represent functional or conceptual components, and they are not always required to be physically constituted as illustrated. In other words, individual separated or integrated forms of the devices in practical use are not limited to the illustrated examples, and the whole or a part of each device can be constituted in the suitable form that is functionally or physically separated or integrated per optional component depending on various loads and various situations in use. For example, the destination address rewriting section 13*c* and the packet transfer section 13*d* can be integrated together. Further, the whole or an optional part of each of the processing functions performed by the various devices can be implemented by using a CPU and a program which is analyzed and executed by the CPU, or can be implemented in hardware using wired logics.

Of the processes described above in the embodiments, the whole or a part of each of the processes having been described to be automatically performed can also be manually performed. Conversely, the whole or a part of each of the processes having been described to be manually performed can also be automatically performed by using suitable one of the known methods. For example, whether or not communication quality is presented in accordance with the contract conditions can also be monitored by human work. Moreover, it is to be noted that the processing procedures, the control procedures, the specific names, and information including various data and parameters, which are described in the above description and shown in the drawings, can be optionally changed unless otherwise specified.

(6) Programs

Figure 8:
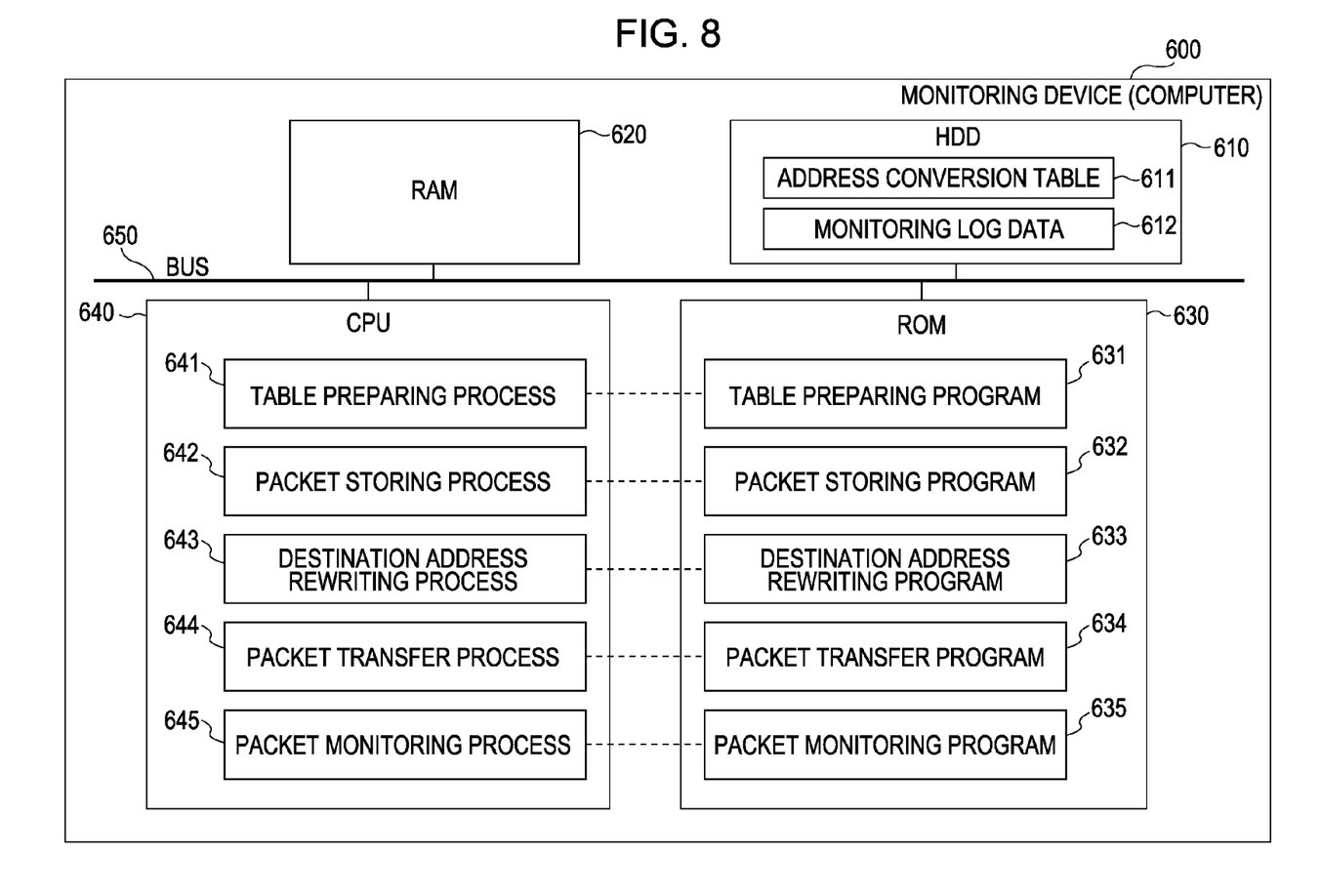
FIG. 8 is a block diagram of a computer for executing a monitoring control program.

Various processes described above in the embodiments can be implemented by executing previously prepared programs with a computer. Therefore, one example of the computer capable of executing the programs having similar functions to those of the foregoing exemplary embodiments will be described below with reference to FIG. 8. FIG. 8 is a block diagram of the computer for executing a monitoring control program.

As shown in FIG. 8, a computer 600 serving as a monitoring device comprises a HDD 610, a RAM 620, a ROM 630, and a CPU 640, which are interconnected via a bus 650.

The ROM 630 previously stores, as the monitoring control program, various kinds of programs for implementing the monitoring device, which provide similar functions to those in one of the above-described embodiments, i.e., a table preparing program 631, a packet storing program 632, a destination address rewriting program 633, a packet transfer program 634, and a packet monitoring program 635, as shown in FIG. 8. As with the components of the monitoring device 10 shown in FIG. 2, the programs 631-635 may be practiced in the form incorporated or separated as required.

When the CPU 640 reads the programs 631-635 from the ROM 630 and executes them, the programs 631-635 function respectively as a table preparing process 641, a packet storing process 642, a destination address rewriting process 643, a packet transfer process 644, and a packet monitoring process 645, which are shown in FIG. 8. The processes 641-645 correspond respectively to the table preparing section 13*a*, the packet storing section 13*b*, the destination address rewriting section 13*c*, the packet transfer section 13*d*, and the packet monitoring section 13*e*, which are shown in FIG. 2.

The HDD 610 includes, as shown in FIG. 8, an address conversion table 611 and monitoring log data 612. The address conversion table 611 and the monitoring log data 612 correspond respectively to the address conversion table 14*a* and the monitoring log storage unit 14*b*, which are shown in FIG. 2. The CPU 640 registers data in the address conversion table 611 and the monitoring log data 612. Further, the CPU 640 reads data from the address conversion table 611 and the monitoring log data 612 for loading into the RAM 620 and executes processing based on the data loaded in the RAM 620.

As described above, the monitoring control system, the monitoring device, the monitoring control method, and the monitoring control program according to the present invention are useful for the case where the monitoring device monitors communication data communicated between communication terminals via a communication infrastructure.

All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A monitoring control system including a monitoring device, the monitoring device comprising:
    a storage configured to store source address and a destination address in a corresponding relationship;
    a first controller configured to receive a communication data, obtain a destination address of the communication data from the storage based on a source address of the communication data and transfer the communication data based on the obtained destination address; and
    the first controller further configured to monitor the communication data.

2. The monitoring control system according to claim 1, wherein the the first controller is further configured to analyze a content type of the communication data and monitor the communication data differently based on the content type.

3. The monitoring control system according to claim 1, further comprising
    a media converter configured to perform media conversion of the communication data when a media conversion instruction is received from a session controller which controls a session related with the communication data,
    wherein the first controller is further configured to transfer the converted communication data to the destination address.

4. The monitoring control system according to claim 1, the first controller is further configured to monitor the communication data when a monitoring request is received from a communication terminal.

5. The monitoring control system according to claim 1, the storage is further configured to store a voiceprint of a user at a communication terminal other than a service target and,
    the first controller is further configured to analyze a voiceprint of the communication data, and to cut off the transfer of the communication data when the analyzed voiceprint is stored in the storage.

6. The monitoring control system according to claim 1, the storage unit is further configured to store the communication data;
    the first controller is further configured to convert the communication data stored in the storage to a certain data format; and
    the first controller is further configured to deliver the converted communication data to a communication terminal.

7. The monitoring control system according to claim 6, wherein the first controller is further configured to deliver the communication data to another communication terminal.

8. The monitoring control system according to claim 1, the first controller is further configured to convert voice data in the communication data to text data,
    wherein the first controller further configured to transfer the converted text data to a region in which a communication terminal can refer to the transferred text data.

9. A monitoring device for monitoring communication data communicated between communication terminals via a communication infrastructure, the monitoring device comprising:
    a storage configured to store source address and a destination address in a corresponding relationship;
    a first controller configured to receive a communication data, obtain a destination address of the communication data from the storage based on a source address of the communication data, and transfer the communication data based on the obtained destination address; and
    the first controller is further configured to monitor the communication data.

10. A monitoring control method for monitoring communication data, the method comprising:
    storing a source address and a destination address in a corresponding relationship;
    receiving by a first controller the communication data, obtaining a destination address corresponding to a source address of the communication data based on the corresponding relationship, and transferring the communication data based on the obtained destination address; and
    monitoring the communication data.

11. The method of claim 10, further comprising:
    analyzing a content type of the communication data,
    wherein the monitoring is dependent on the content type of the communication data.

12. The method of claim 10, further comprising:
    converting the media of the communication data from a first type of media to a second type of media.

13. The method of claim 12, wherein the converting the media occurs when an instruction for performing the media conversion of the communication data is received from a session controller which controls a session.

14. The method of claim 10, further comprising:
    storing a voiceprint of a user at the communication terminal other than a service target, and
    analyzing a voiceprint of the communication data, wherein the transfer of the communication data is cut off when the analyzed voiceprint is stored.

15. A non-transitory computer readable medium comprising a monitoring control program, the program when executed by a computer comprising:
    storing, a source address and a destination address in a corresponding relationship;
    receiving the communication data, obtaining a destination address corresponding to a source address of the communication data from the stored corresponding relationship, and transferring the communication data based on the obtained destination address; and
    monitoring the communication data.

* * * * *